(12) United States Patent
Kim

(10) Patent No.: US 12,310,817 B2
(45) Date of Patent: May 27, 2025

(54) FIXTURE ENGAGEMENT STRUCTURE, FIXTURE AND DENTAL IMPLANT ASSEMBLY

(71) Applicant: TRUABUTMENT KOREA, INC., Bucheon-si (KR)

(72) Inventor: HaengOh Kim, Busan (KR)

(73) Assignee: TRUABUTMENT KOREA, INC., Bucheon-si (KR)

( * ) Notice: Subject to any disclaimer, the term of this patent is extended or adjusted under 35 U.S.C. 154(b) by 559 days.

(21) Appl. No.: 17/480,566

(22) Filed: Sep. 21, 2021

(65) Prior Publication Data

US 2022/0378556 A1 Dec. 1, 2022

(30) Foreign Application Priority Data

May 26, 2021 (KR) .................. 10-2021-0067709

(51) Int. Cl.
*A61C 8/00* (2006.01)
(52) U.S. Cl.
CPC .......... *A61C 8/0066* (2013.01); *A61C 8/0068* (2013.01); *A61C 8/0069* (2013.01)
(58) Field of Classification Search
CPC ..... A61C 8/006; A61C 8/0066; A61C 8/0037; A61C 8/0068; A61C 8/0069
See application file for complete search history.

(56) References Cited

U.S. PATENT DOCUMENTS

2015/0147725 A1* 5/2015 Magnusson .......... A61C 8/0001
433/201.1

FOREIGN PATENT DOCUMENTS

| BG | 3585 U1 * | 4/2020 |
| KR | 10-2014-0067030 A | 6/2014 |
| WO | WO 2013/037730 A1 | 3/2013 |

* cited by examiner

*Primary Examiner* — Cris L. Rodriguez
*Assistant Examiner* — Luis Ruiz Martin
(74) *Attorney, Agent, or Firm* — NSIP Law

(57) ABSTRACT

Disclosed herein a fixture engagement structure which constitutes a dental implant assembly and engages with a fixture inserted into a jawbone. The fixture engagement structure comprises: a first engagement structure alignment portion that is placed radially in an engagement area portion engaging with the fixture; and at least one second engagement structure alignment portion that is placed radially in the engagement area portion so as to be separate from the first engagement structure alignment portion and is arranged asymmetrically with respect to a center point located on a central axis of the fixture engagement structure. The second engagement structure alignment portion has a larger size than the first engagement structure alignment portion, along at least one of an outer circumference direction and a radial direction of the engagement area portion.

14 Claims, 9 Drawing Sheets

FIXTURE ENGAGEMENT STRUCTURE, FIXTURE AND DENTAL IMPLANT ASSEMBLY

CROSS REFERENCE TO RELATED APPLICATION

The present application claims priority to Korean Patent Application No. 10-2021-0067709, filed May 26, 2021, the entire contents of which is incorporated herein for all purposes by this reference.

BACKGROUND OF THE INVENTION

1. Field of the Invention

The present disclosure relates to a fixture engagement structure, a fixture and a dental implant assembly including the fixture engagement structure and the fixture, and more particularly to a fixture engagement structure for realizing quick positioning and exact alignment during engagement between the fixture engagement structure and a fixture, the fixture and a dental implant assembly including the fixture and the fixture engagement structure.

2. Description of the Related Art

Generally, implant is composed of a fixture inserted into a jawbone, an abutment inserted and fixed in the fixture, and a prosthesis bonded to cover an upper part of abutment.

A fixture, which is inserted into a jawbone, plays the role of tooth root, a prosthesis is made in a tooth-like shape to become the visible part of artificial tooth, and an abutment fixes a prosthesis to a fixture so that loads on the prosthesis are transmitted to the fixture and the jawbone.

A final prosthesis is supposed to have a size and structure naturally engaging with the residual teeth of a patient in both functional and aesthetic aspects. To this aim, a patient's jawbone model is used, and proper prosthetic treatment is needed for each patient. Herein, the model includes a fixture. In addition, such proper prosthetic treatment may be digitally implemented based on a digital model for a patient's jawbone in which a fixture is already inserted into or not yet. In addition, a prefab abutment may be modified to fit into the shapes of soft gums and teeth.

Thus, similar to an interface between a fixture and a jawbone, there may be an abutment-fixture interface in which an abutment should be placed unilaterally for a fixture. An abutment should be placed in a desired rotational relation for either or both of a fixture and a jawbone including surrounding teeth. A fixture and an abutment need to be fabricated so as to enable a practitioner to connect the abutment to a predetermined fixture or a jawbone feature in an exact rotational direction or in an exact alignment position. Furthermore, a customized abutment may be fabricated to have a superstructure that is rotationally oriented on purpose for a fixture and a surrounding shape or has an asymmetric shape. It is desirable to fabricate a fixture and an abutment so that the superstructure of the abutment may be connected to ensure exact rotational orientation for the fixture and other features in mouth.

A practitioner may receive an abutment and an artificial tooth as a single integrated unit or as separate components to be assembled in a patient's mouth. A practitioner who wants to use an abutment and an artificial tooth for a patient should recognize the rotational orientation of the abutment for a fixture beforehand in order to obtain an alignment intended by an implant manufacturer. However, it may difficult for a practitioner to confirm exact orientation of an abutment for a fixture, and when the practitioner misses the exact orientation, a fatal mistake may occur in treatment. Furthermore, since an existing coupling structure of a fixture and an abutment consists of a projection and a groove that are equally spaced and have a same size, a practitioner needs to rotate the abutment, when coupling it with the fixture, by comparing the superstructure of the abutment and surrounding teeth. This makes it very difficult for a practitioner to exactly couple a fixture and an abutment, and even a skilled practitioner should spend much time in coupling.

SUMMARY OF THE INVENTION

A technical object of the present disclosure is to provide a fixture engagement structure for realizing quick positioning and exact alignment during engagement between the fixture engagement structure and a fixture, the fixture and a dental implant assembly including the fixture and the fixture engagement structure.

The objects of the present invention are not limited to the above-mentioned objects, and other objects not mentioned can be clearly understood by those skilled in the art from the following description.

According to the present disclosure, there is provided a fixture engagement structure which constitutes a dental implant assembly and engages with a fixture inserted into a jawbone. The fixture engagement structure comprises: a first engagement structure alignment portion that is placed radially in an engagement area portion engaging with the fixture, and at least one second engagement structure alignment portion that is placed radially in the engagement area portion so as to be separate from the first engagement structure alignment portion and is arranged asymmetrically with respect to a center point located on a central axis of the fixture engagement structure. The second engagement structure alignment portion has a larger size than the first engagement structure alignment portion, along at least one of an outer circumference direction and a radial direction of the engagement area portion.

According to the embodiment of the present disclosure in the fixture engagement structure, when there is a multiplicity of the first engagement structure alignment portions, the first engagement structure alignment portions may be placed at an equal interval along the outer circumference direction, and the second engagement structure alignment portion may be placed between the first engagement structure alignment portions. The second engagement structure alignment portion according to the outer circumference direction may have a larger size than an outer circumference size virtually connecting the first engagement structure alignment portions adjacent to each other.

According to the embodiment of the present disclosure in the fixture engagement structure, the first engagement structure alignment portion may comprise a first engagement structure end portion that is located at a side end facing the fixture, and the second engagement structure alignment portion may comprise a second engagement structure end portion at a side end facing the fixture. The first and second engagement structure end portions may be formed to have a same level.

According to the embodiment of the present disclosure in the fixture engagement structure, the first engagement structure alignment portion may comprise a first engagement structure end portion that is located at a side end facing the fixture, and the second engagement structure alignment portion comprises a second engagement structure end portion at a side end facing the fixture. The first and second engagement structure end portions may be formed to be tapered.

According to the embodiment of the present disclosure in the fixture engagement structure, the fixture may have first and second fixture alignment portions corresponding to the first and second engagement structure alignment portions, and a spacing portion placed between the first and second fixture alignment portions, and the fixture engagement structure further may comprise a guide portion that is provided to the engagement area portion and is placed closer to the fixture than to the first and second engagement structure alignment portions, when engaging with the fixture. The guide portion may be formed so that the guide portion attaches to a side wall of the spacing portion and the fixture engagement structure enters the fixture.

According to another embodiment of the present disclosure, there is provided a fixture, which constitutes a dental implant assembly, is inserted into a jawbone and engages with a fixture engagement structure. The fixture comprises: a first fixture alignment portion that is placed radially in an area portion engaging with the fixture engagement structure, and at least one second fixture alignment portion is placed radially in the area portion so as to be separate from the first fixture alignment portion and is arranged asymmetrically with respect to a center point located on a central axis of the fixture. The second fixture alignment portion has a larger size than the first fixture alignment portion, along at least one of an inner circumference direction and a radial direction of the area portion.

According to the embodiment of the present disclosure in the fixture, when there is a multiplicity of the first fixture alignment portions, the first fixture alignment portions may be placed at an equal interval along the inner circumference direction, and the second fixture alignment portion may be placed between the first fixture alignment portions. The second fixture alignment portion according to the inner circumference direction may have a larger size than an inner circumference size virtually connecting the first fixture alignment portions adjacent to each other.

According to the embodiment of the present disclosure in the fixture, the fixture further may comprise a multiplicity of spacing portions that are placed between the first and second fixture alignment portions. The spacing portions have fixture end portions, respectively, which are located at a side end facing the fixture engagement structure. And the fixture end portions are formed to have a same level.

According to the embodiment of the present disclosure in the fixture, the fixture further may comprise a spacing portion that is placed between the first and second fixture alignment portions. The spacing portion may have a fixture end portion that is located at a side end facing the fixture engagement structure, and the fixture end portion may be formed to be tapered.

According to the embodiment of the present disclosure in the fixture, the fixture engagement structure may have first and second engagement structure alignment portions corresponding to the first and second fixture alignment portions, and a guide portion that is placed closer to the fixture than to the first and second engagement structure alignment portions, when engaging with the fixture. The fixture further may comprise a spacing portion placed between the first and second fixture alignment portions. And the spacing portion may be formed to attach to a side wall of the guide portion, when the fixture engagement structure enters the fixture.

According to the embodiment of the present disclosure in the fixture, the fixture further may comprise a first thread portion that is placed closest to the fixture engagement structure, when the fixture engages with the fixture engagement structure, a second thread portion that is placed under the first thread portion, and a third thread portion that is placed under the second thread portion and is machined to have a slope converging towards an end. The second thread portion may comprise a second ridge portion with a spiral shape and a second bottom portion having a smaller central axis radius than the second ridge portion. A central axis radii of the second ridge portion and the second bottom portion may be constant along the central axis, and a ratio of central axis radii between the second ridge portion and the second bottom portion may range from 1.13:1 to 1.18:1.

According to another embodiment of the present disclosure, there is provided A dental implant assembly comprising a fixture inserted into a jawbone and a fixture engagement structure engaging with the fixture. The fixture engagement structure comprises: a first engagement structure alignment portion that is placed radially in an engagement area portion engaging with the fixture, and at least one second engagement structure alignment portion that is placed radially in the engagement area portion so as to be separate from the first engagement structure alignment portion and is arranged asymmetrically with respect to a center point located on a central axis of the fixture engagement structure. The fixture comprises a first fixture alignment portion that is radially placed so as to match the first engagement structure alignment portion in an area portion engaging with the fixture engagement structure, and at least one second fixture alignment portion that is radially placed so as to be separate from the first fixture alignment portion and is arranged asymmetrically with respect a center point located on a central axis of the fixture, in order to match the second engagement structure alignment portion in the area portion. The second engagement structure alignment portion has a larger size than the first engagement structure alignment portion along at least one of an outer circumference direction and a radial direction of the engagement area portion. And the second fixture alignment portion has a larger size than the first fixture alignment portion along at least one of an inner circumference direction and a radial direction of the area portion.

The features briefly summarized above for this disclosure are only exemplary aspects of the detailed description of the disclosure which follow, and are not intended to limit the scope of the disclosure.

The present disclosure may provide a fixture engagement structure for realizing quick positioning and exact alignment during engagement between the fixture engagement structure and a fixture, the fixture and a dental implant assembly including the fixture and the fixture engagement structure.

In addition, no effect is excluded which may be derived from a configuration that those skilled in the art are able to understand through the present specification.

DETAILED DESCRIPTION OF THE INVENTION

Figure 1:
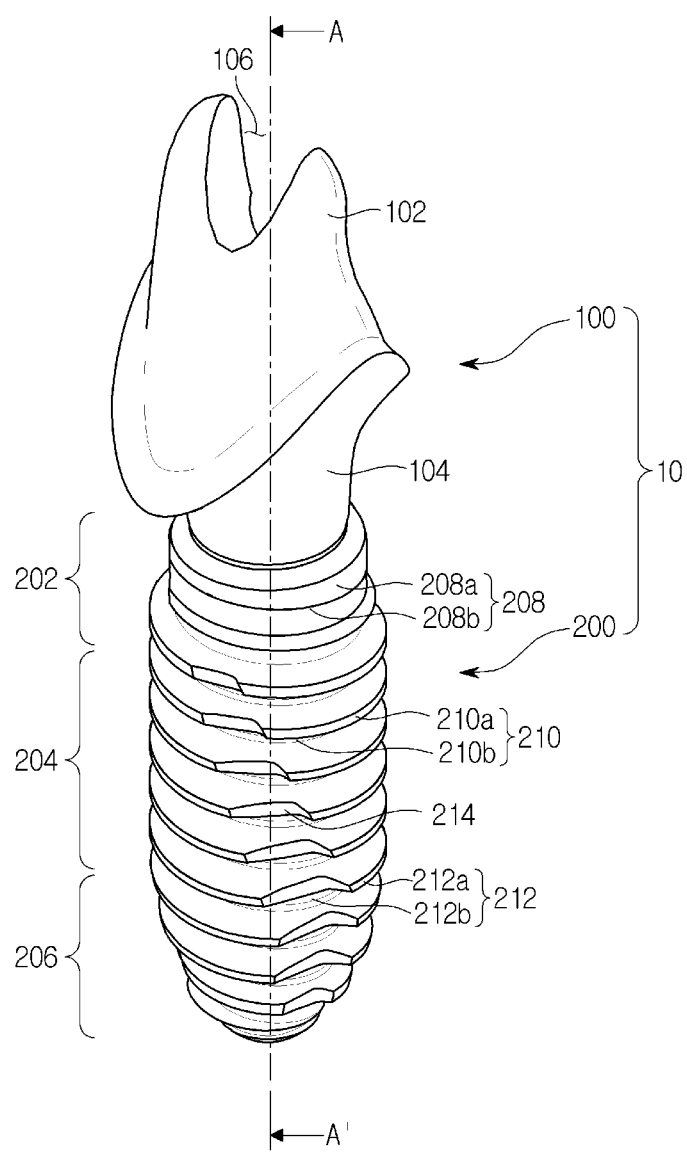
FIG. 1 is a perspective view of a dental implant assembly including a fixture engagement structure and a fixture according to the present disclosure.

Hereinafter, embodiments of the present disclosure will be described in detail with reference to accompanying drawings, which will be easily implemented by those skilled in the art. However, the present disclosure may be embodied in many different forms and is not limited to the embodiments described herein.

In the following description of the embodiments of the present disclosure, a detailed description of known functions and configurations incorporated herein will be omitted when it may make the subject matter of the present disclosure rather unclear. In addition, parts not related to the description of the present disclosure in the drawings are omitted, and like parts are denoted by similar reference numerals.

In the present disclosure, when a component is referred to as being "linked", "coupled", or "connected" to another component, it is understood that not only a direct connection relationship but also an indirect connection relationship through an intermediate component may also be included. Also, when a component is referred to as "comprising" or "having" another component, it may mean further inclusion of another component not the exclusion thereof, unless explicitly described to the contrary.

In the present disclosure, the terms such as first and second are used only for the purpose of distinguishing one component from another, and do not limit the order or importance of components, etc. unless specifically stated otherwise. Thus, within the scope of this disclosure, a first component in one embodiment may be referred to as a second component in another embodiment, and similarly a second component in one embodiment may be referred to as a first component.

In the present disclosure, components described in the various embodiments are not necessarily essential components, and some may be optional components. Accordingly, embodiments consisting of a subset of the components described in one embodiment are also included within the scope of the present disclosure. Also, embodiments that include other components in addition to the components described in the various embodiments are also included in the scope of the present disclosure.

Hereinafter, exemplary embodiments of the present invention will be described in detail with reference to the accompanying drawings and the contents described below. However, the present invention is not limited to the embodiments described herein and may be embodied in other forms. Rather, the embodiments introduced herein are provided to ensure that the disclosed subject matter is thorough and complete, and that the scope of the invention will be fully conveyed to those skilled in the art. Like numbers refer to like elements throughout. Meanwhile, the terminology used herein aims to describe particular embodiments only and is not intended to limit the present invention. In this specification, the singular forms also include the plural unless specifically stated otherwise in the text. As used herein, "comprises" and/or "comprising" specifies the presence of the mentioned shapes, numbers, steps, actions, members and/or elements. It does not exclude the presence or addition of one or more other shapes, numbers, steps, actions, members, elements and/or groups thereof.

In addition, expressions of location relations used in the present specification such as "upper", "lower", "left" and "right" are employed for the convenience of explanation, and in case drawings illustrated in the present specification are inversed, the location relations described in the specification may be inversely understood.

Hereinafter, a dental implant assembly including a fixture engagement structure and a fixture according to the present disclosure will be described with reference to FIG. 1 and FIG. 2.

Figure 2:
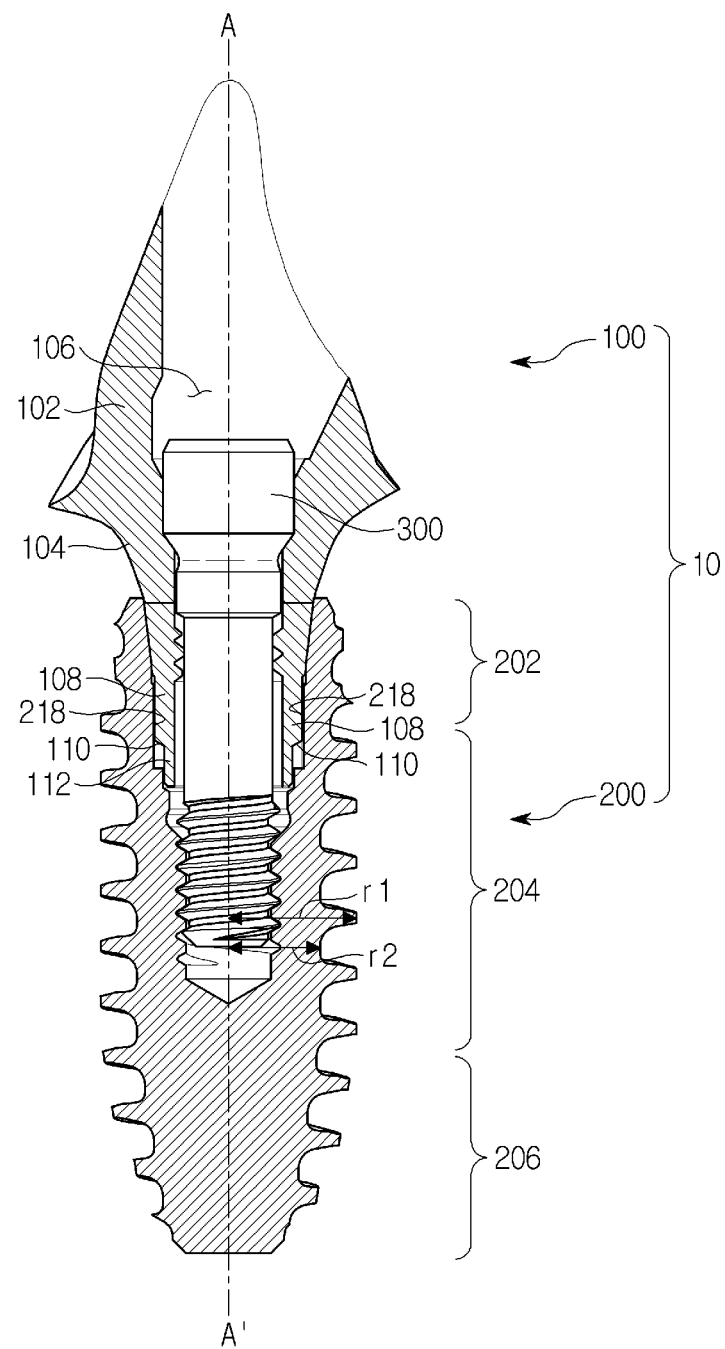
FIG. 2 is a cross-sectional view of the dental implant assembly along the line A-A' of FIG. 1.

FIG. 1 is a perspective view of a dental implant assembly including a fixture engagement structure and a fixture according to the present disclosure, and FIG. 2 is a cross-sectional view of the dental implant assembly along the line A-A' of FIG. 1.

A dental implant assembly 10 may include a fixture engagement structure 100, a fixture 200, and a screw 300 for coupling the fixture engagement structure 100 and the fixture 200 together.

The fixture engagement structure 100 may be one of various structures engaging with the fixtures 200 that is inserted into a jawbone. For example, the fixture engagement structure 100 may include a superstructure for connecting a prosthesis to the fixture 200. The superstructure may include an abutment, which is coupled to the dental fixture to fill the gingiva that covers the maxilla or mandible, spacer, or any other gingival penetrating component. For example, a prosthesis like a crown, a bridge and a denture may be secured to the abutment.

In addition, the fixture engagement structure 100 may be a structure selected from a group consisting of, for example, a customized abutment, an abutment replica, an abutment blank, a scan abutment, a digital transfer coping, an impression pick-up element, and a healing cap.

The digital transfer coping may be scanned to have some distinct features indicative of rotational orientation and be connected to the fixture 200, and a digital file is transferred to an abutment maker. The digital file may contain information on the position and orientation of the fixture 200 as well as the position and orientation of a distinct feature.

In addition, the customized abutment may have a shape in the form of a tooth and neighboring tissues in a patient. In this case, the customized abutment is very useful, if a practitioner easily adjusts the customized abutment to a desired rational orientation. Apart from the customized abutment, a general abutment may also be rotationally oriented to the fixture 200 and a surrounding shape on purpose or may be formed in an asymmetric shape. For that, the fixture engagement structure 100 according to the present disclosure is embodied for exact alignment with the fixture 200. In the present disclosure, for the convenience of explanation, the fixture engagement structure 100 illustrated by the drawings will be described as an example of a general abutment or a customized abutment. However, the embodiments below are certainly applicable to the fixture engagement structure 100 with various structures that have specific forms customized to patients and thus need to be exactly aligned with a fixture.

The fixture 200 may be used as a securing element of a dental prosthesis. For that, the fixture 200 may be inserted into a borehole that is already formed in the bone tissue of jawbone at a position in which a dental prosthesis is required. A dental fixture may be normally rotated into a borehole. In the case of a threaded fixture, a female screw may be beforehand formed in a borehole, or no thread may be formed in the borehole. In this case, for example, the fixture 200 may have self-tapping capability by providing one or more cutting recesses, edges or notches, which extend in an axial direction, to the thread of the fixture 200. For example, an apical end of the fixture 200 may have two to four cutting recesses. Of course, it is possible to consider other numbers of cutting recesses.

Hereinafter, the fixture engagement structure 100, which is illustrated as an example of customized abutment in FIG. 1 and FIG. 2, will be described in detail.

Figure 3A:
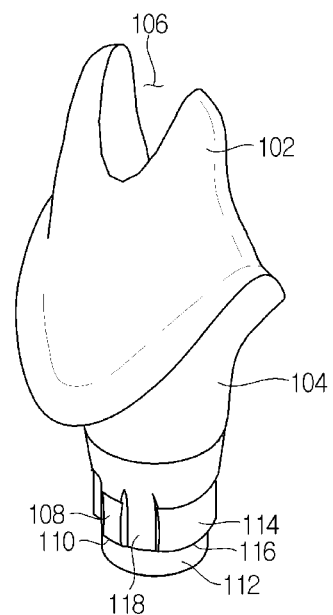
FIG. 3A to FIG. 3C are perspective views and a bottom view for an abutment illustrated as a fixture engagement structure according to the present disclosure.
Figure 3B:
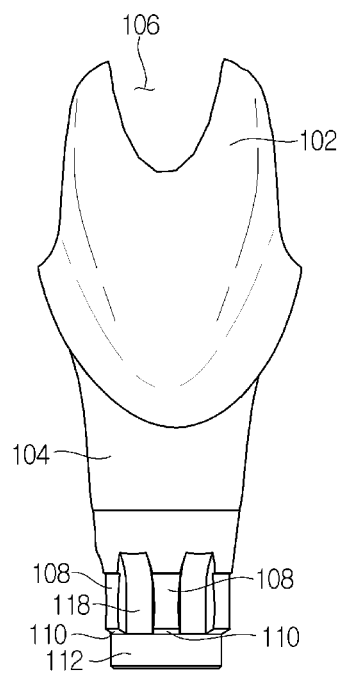
Figure 3C:
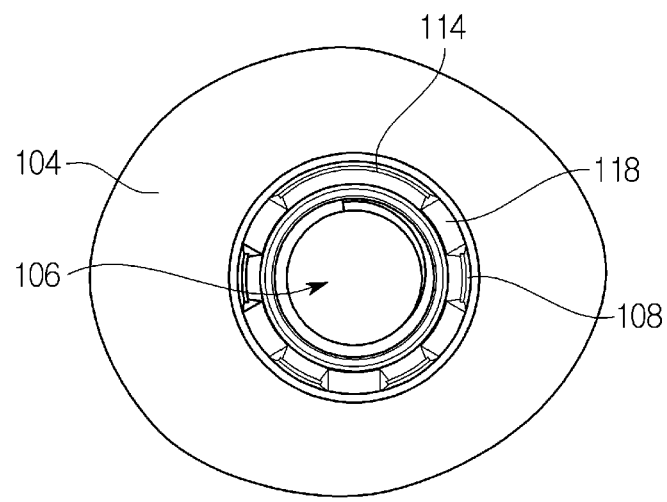

The fixture engagement structure 100 may include an apical area section 102 coupled to a prosthesis, an engagement area portion 104 providing a portion engaging with the fixture 200, and a hole 106 penetrating the area sections 102 and 104. In addition, referring to FIG. 3A to FIG. 3C, the fixture engagement structure 100 may include a first engagement structure alignment portion 108, a second engagement structure alignment portion 114, which are placed at the bottom of the engagement area portion 104, and a gap portion 110, which is located between the engagement structure alignment portions 108 and 114, and a guide portion 112 provided under the alignment ports 108 and 114. FIG. 3A to FIG. 3C are perspective views and a bottom view for an abutment illustrated as a fixture engagement structure according to the present disclosure.

The first engagement structure alignment portion 108 may be radially arranged in the engagement area portion 104 engaging with the fixture 200. A multiple number of the first engagement structure alignment portions 108 may be provided and be arranged at an equal interval along an outer circumference (B of FIG. 4 and FIG. 5) of the engagement area portion 104. The first engagement structure alignment portion 108 may be machined to have a protruding shape in a radial direction (C of FIG. 4 and FIG. 5), that is, in the direction of radius tending outwards from a central axis (line A-A') of the fixture engagement structure 100. In this case, the gap portion 118 may be formed in a groove shape. As another example, the first engagement structure alignment portion 108 may be machined to have a groove shape in a radial direction. In this case, the gap portion 118 may be formed in a protruding shape. In this embodiment, for the convenience of explanation, the first engagement structure alignment portion 108 will be described to be formed in a protruding shape.

The first engagement structure alignment portion 108 may have a first engagement structure end portion 110 located at a side end facing the fixture 200. The first engagement structure end portion 110 may be formed to be tapered. A taper shape of the first engagement structure end portion 110 may be formed in a shape corresponding to a fixture end portion 224 placed on top of a spacing portion 222 of the fixture 200. When the fixture engagement structure 100 rotates to align its position to the fixture 200, the first engagement structure end portion 110 and the fixture end portion 224 are in contact and friction. Thus, a practitioner may be able to rotate the fixture engagement structure 100 easily and stably.

Figure 4:
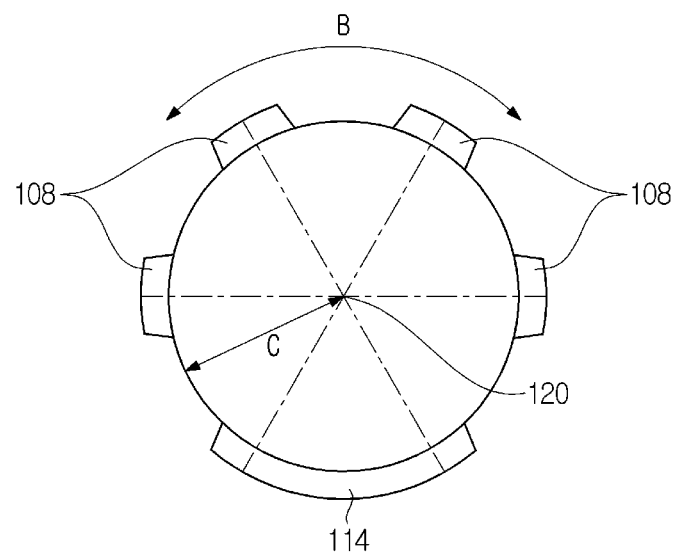
FIG. 4 is an embodiment regarding an engagement structure alignment portion of an abutment.
Figure 5:
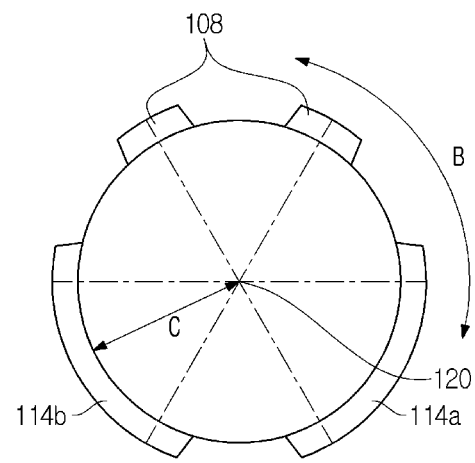
FIG. 5 is another embodiment regarding an engagement structure alignment portion of an abutment.

The second engagement structure alignment portion 114 is arranged radially in the engagement area portion 104 to be separate from the first engagement structure alignment portion 108. The second engagement structure alignment portion 114 may be arranged asymmetrically with respect to a center point C located on a central axis (line A-A'). The second engagement structure alignment portion 114 may have a larger size than the first engagement structure alignment portion 108 in at least one of the direction of outer circumference B and the radial direction C. In addition, the second engagement structure alignment portion 114 may be formed according to at least one of the examples illustrated in FIG. 4 and FIG. 5. FIG. 4 is an embodiment regarding an engagement structure alignment portion of an abutment, and FIG. 5 is another embodiment regarding an engagement structure alignment portion of an abutment.

When the first engagement structure alignment portion 108 is formed to protrude, the second engagement structure alignment portion 114 may be machined to have a protruding shape in a radial direction. As another example, when the first engagement structure alignment portion 108 is formed as a groove, the second engagement structure alignment portion 114 may be machined to have a groove shape in a radial direction C. In this embodiment, for the convenience of explanation, the second engagement structure alignment portion 114 is described to be formed in a protruding shape.

In case the first and second engagement structure alignment portions 108 and 114 are described with reference to FIG. 4, the first engagement structure alignment portion 108 may be provided at an equal interval along the outer circumference B. In case the second engagement structure alignment portion 114 is absent, the first engagement structure alignment portion 108 may be provided at 60 degree interval so that the number of the first engagement structure alignment portions becomes six. When the number of the first engagement structure alignment portions 108 thus arranged is four as shown in FIG. 4, the first engagement structure alignment portions 108 may be arranged symmetrically with respect to the center point C of the fixture engagement structures 100. As illustrated in FIG. 4, for quick and exact position alignment of one second engagement structure alignment portion 114 to the second fixture alignment portion 220 of the fixture 200 and for the convenience of machining, the second engagement structure alignment portion 114 may be formed to have a larger size than the first engagement structure alignment portion 108 along the outer circumference B. As an example, for the convenience of machining, convenient checking of misalignment with the fixture 200 and exact alignment, the second engagement structure alignment portion 114 along the outer circumference B may be formed to be larger than a size of outer circumference virtually connecting the neighboring first engagement structure alignment portions 108. As another example, for convenient rotation and quick position alignment in case of misalignment with the fixture 200, the second engagement structure alignment portion 114 along the outer circumference B may be formed to be smaller than a size of outer circumference virtually connecting the neighboring first engagement structure alignment portions 108. In this embodiment, the second engagement structure alignment portion 114 is described to have a larger size than the first engagement structure alignment portion 108 along the outer circumference B. However, as another example, the second engagement structure alignment portion 114 may be machined to have a larger size than the first engagement structure alignment portion 108 along the radial direction C. Hereinafter, for the convenience of explanation, an embodiment will be described regarding the second engagement structure alignment portion 114 having a large size in the direction of outer circumference B. In an embodiment of the second engagement structure alignment portion having a large size in the radial direction C, the second engagement structure alignment portion may also be formed to have a larger size than the first engagement structure alignment portion along the direction of outer circumference B.

The second engagement structure alignment portion 114 may be machined to be symmetric with respect to a diameter direction (or radial direction) of the fixture engagement structure 110 that passes through the second engagement structure alignment portion 114. However, the shape and arrangement of the second engagement structure alignment portion 114 may be formed to be asymmetric with respect to a center point C. Specifically, an outer circumference of the second engagement structure alignment portion 114 along a direction of outer circumference B may be extended within a range that is asymmetric with respect to the center point C. When the outer circumference of the second engagement structure alignment portion 114 is extended to a range that is symmetric with respect to the center point C, the number of the first engagement structure alignment portions 108 may be excessively reduced. Thus, while the fixture engagement structure 100 rotates in the fixture 200, the first engagement structure alignment portion 108 may be inserted deep into the second fixture alignment portion 220 of the fixture 200, thereby causing difficulty in additional rotation for expected position alignment.

In addition, as shown in FIG. 4, the second engagement structure alignment portion 114 may be arranged asymmetrically with every first engagement structure alignment portion 108 with respect to the center point C. Accordingly, an abutment, which is fabricated by a manufacturer to have a predetermined specific position or rotational orientation, may be exactly arranged and engage with the fixture 200 in accordance with the manufacturer's intent.

In an embodiment of the second engagement structure alignment portion having a large size in the radial direction C, the second engagement structure alignment portion itself may be formed to be asymmetric with respect to the center point C, similar to what is described above, and may be arranged asymmetrically with every first engagement structure alignment portion with respect to the center point C.

The second engagement structure alignment portion 114 may have a second engagement structure end portion 116 located at a side end facing the fixture 200. The second engagement structure end portion 116 may be formed to be tapered. A taper shape of the second engagement structure end portion 116 may be formed in a shape corresponding to the fixture end portion 224 and the first engagement structure end portion 110. When the fixture engagement structure 100 rotates to align its position to the fixture 200, the first and second engagement structure end portions 110 and 116 and the fixture end portion 224 in contact and friction. Thus, a practitioner may be able to rotate the fixture engagement structure 100 easily and stably.

In addition, the first and second engagement structure end portions 110 and 116 may be machined to have a same level in a longitudinal direction along a central axis (line A-A') in order to prevent the disadvantage described below. In case the first engagement structure end portion 110 is extended to further than the second engagement structure end portion 116 in a direction toward the bottom of the engagement area portion 104, when the fixture engagement structure 100 enters into the fixture 200, the fixture engagement structure 100 may be inserted into the second fixture alignment portion 220 having a larger size than the first engagement structure alignment portion 108. Thus, the fixture engagement structure 100 may be misaligned in an inaccurate position of the fixture 200, and additional rotation may not be easy.

The embodiment illustrated in FIG. 5 assumes that a multiple number of second engagement structure alignment portions 114a and 114b are arranged. The second engagement structure alignment portions 114a and 114b illustrated in FIG. 5 are actually the same as in FIG. 4, apart from what is described below.

For specific position alignment between the fixture engagement structure 100 and the fixture, for example, one unique position or rotational orientation designated by a manufacturer, the two second engagement structure alignment portions 114a and 114b illustrated in FIG. 5 may be arranged to be asymmetric with each other with respect to the center point C. In case the second engagement structure alignment portions 114a and 114b and the corresponding second fixture alignment portions are symmetric with respect to the center point C, even when one unique position is determined by asymmetric machining of the apical area section 102, an error may occur in which the second engagement structure alignment portions 114a and 114b and the second fixture alignment portions are coupled in a position or orientation that is not intended by a manufacturer. Accordingly, in order to prevent the error, the multiple second engagement structure alignment portions 114a and 114b and the second fixture alignment portions may be arranged to be asymmetric with respect to the center point C.

In addition, as illustrated in FIG. 5, the second engagement structure alignment portions 114a and 114b may be arranged following the first engagement structure alignment portions 108a that are successively arranged. As another example, the second engagement structure alignment portions 114a and 114b may be arranged at least one by one alternately between the first engagement structure alignment portions 108a. As yet another example, a random number of the second engagement structure alignment portions 114a and 114b may be arranged between the first engagement structure alignment portions 108a. In order to align and engage an abutment, which is fabricated to have a unique position or rotational orientation, exactly with the fixture 200, the second engagement structure alignment portions 114a and 114b in the above cases may be arranged asymmetrically with every first engagement structure alignment portion 108.

In an embodiment of a second engagement structure alignment portion having a large size in a radial direction C, second engagement structure alignment portions may also be arranged in a multiple number, and the above description regarding an embodiment according to the direction of an outer circumference B may be similarly applied.

In order to make the fixture engagement structure 100 easily enter into an open end of a first area section 202 and make the engagement structure alignment portions 108 and 114 stably settle in a fixture end 224, the guide portion 112 may be provided at the bottom end of the engagement area portion 104 and, when engaging with the fixture 200, may be arranged closer to the fixture 200 than to the first and second engagement structure alignment portions 108 and 114. The guide portion 112 may be fabricated to have a diameter very close to a side wall of a spacing portion 222 located between first and second fixture alignment portions 218 and 220 of the fixture 200. Accordingly, for example, even when misalignment between the first engagement structure alignment portion 108 and the second fixture alignment portion 220 causes the first engagement structure alignment portion 108 to be located in an inaccurate position like the second fixture alignment portion 220, the guide portion 112 and the spacing portion 222 attach to each other, and then the first engagement structure alignment portion 108 may not be inserted deep into the second fixture alignment portion 220. Thus, it is possible to easily implement additional rotation of the fixture engagement structure 100 for exact position alignment on the fixture 200.

The above-described embodiment for the fixture engagement structure 100 shows an example of arranging the first engagement structure alignment portions 108 at 60 degree interval, but is not limited thereto. For example, the first engagement structure alignment portions 108 may be arranged at an equal interval of 90 degrees and may be arranged at an equal interval of 45 degrees.

Figure 6:
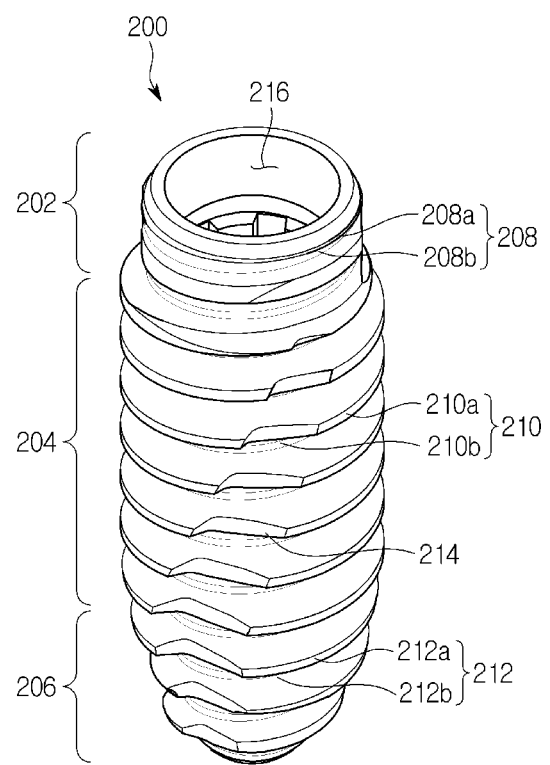
FIG. 6 is a perspective view of fixture according to the present disclosure.
Figure 7:
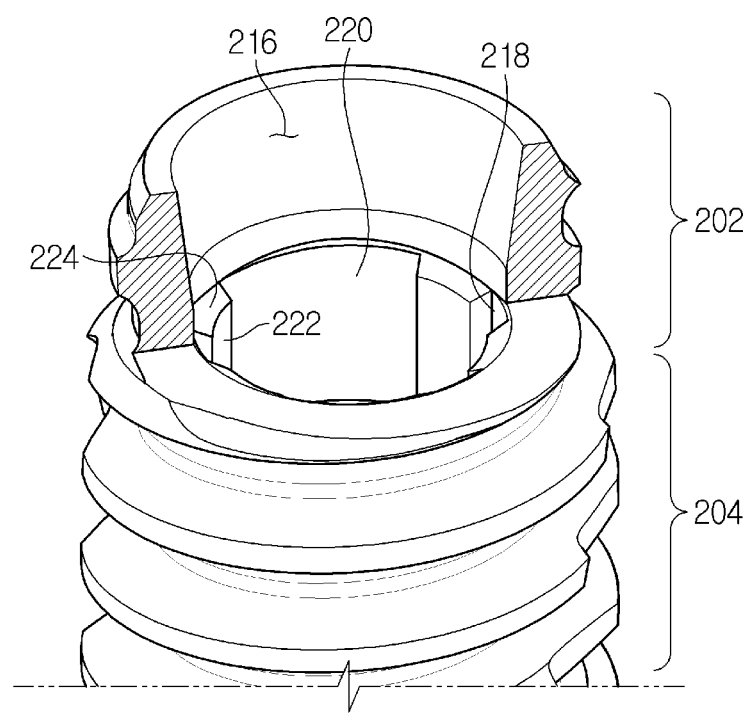
FIG. 7 is a partial exploded perspective view of fixture according to the present disclosure.

FIG. 6 is a perspective view of fixture according to the present disclosure, and FIG. 7 is a partial exploded perspective view of fixture according to the present disclosure.

Referring to FIG. 6 and FIG. 7, the fixture 200 may form a dental implant by being inserted into bone tissue composed of cortical bone and cancellous bone. The fixture 200 has an approximately cylindrical shape, and a spiral ridge portion may be formed on the outer circumferential surface. When the fixture 200 is rotated along a central axis (line A-A'), the fixture 200 is inserted into cortical bone and cancellous bone and may be placed by forming a thread groove on an inner circumferential surface of a placement hole that is already prepared in bone tissue by means of a drill. Herein, titanium is normally used as a material of the fixture 200, but other types of metal materials may be used as long as no rejection occurs in human body.

The fixture 200 may include a first area section 202 corresponding to a cortical bone during insertion of bone tissue, a second area section 204 corresponding to a cancellous bone during insertion, a third area section 206, which is placed and tapered under the second area section 204, a cutting portion 214, which passes from the second area section 204 to the third area section 206, and a receiving portion 216 in which the bottom of the fixture engagement structure 100 engages with a screw 300.

The first area section 202 is a part that is mostly inserted into cortical bone, when the fixture 200 is inserted. Although the first area section 202 is an upper part of the fixture 200, a part of the lower part of the first area section 202 may be inserted into cancellous bone. The first area section 202 may a multiplicity of first thread portions 208 that has a first ridge portion 208a, which is machined in a spiral shape on an outer circumferential surface, and a first bottom portion 208b, which is formed with a smaller radius of central axis (radius tending in a radial direction C from the central axis (line A-A')). The first ridge portion 208a and the first bottom portion 208b are alternately arranged along the direction of central axis (line A-A'). The multiplicity of first thread portions 208 may be arranged by being spaced at a predetermined angle, for example, an equal angle along the rotating direction of central axis (line A-A') on the outer circumferential surface. The first ridge portion 208a may be machined so that the diameter gradually increases from a predetermined point according to the outer circumference direction. Accordingly, stress on the upper part of a cortical bone may be reduced, and a fixing force at the cortical bone near a cancellous bone may be secured.

The second area section 204 may be located by being wholly combined with the bottom of the first area section 202 but is not limited thereto, and another structure may be located between the first and second area sections 202 and 204. The second area section 204 is a portion that is mostly inserted into the cancellous bone, but the upper part of the second area section 204 may be partially inserted into the cortical bone. The second area section 204 includes a second thread portion 210, which has a second ridge portion 210a machined in a spiral shape on the outer circumferential surface and a second bottom portion 210b formed with a smaller radius of the central axis, and the second ridge portion 210a and the second bottom portion 210b may be alternately arranged along the direction of central axis (line A-A'). In addition, as illustrated in FIG. 2, the central axis radii of the second ridge portion 210a and the second bottom portion 210b are constant along the central axis (line A-A'), and the ratio (r1/r2) of central axis radii between the second ridge portion 210a and the second trough 210b may be 1.13~1.18:1. When the lower limit among the ratios of radii (r1/r2) is set as the ratio described above, the density of friction with bone tissue in a patient with weak ossein may be increased so that the fixture 200 may be supported by the bone tissue more stably. When the upper limit among the ratios of radii (r1/r2) is set as the ratio describes above, the placement stress on the bone tissue caused by the fixture 200 may increase excessively so that poor placement may be prevented.

The second thread portion 210 may be successively connected to the first thread portion 208. Accordingly, without a drastic increase in placement torque, the fixture 200 may be smoothly inserted into bone tissue. In addition, the second ridge portion 210a may be machined to have a smaller central axis radius than the first ridge portion 208a. Thus, the second ridge portion 210a may encourage smooth placement in a cortical bone.

The third area section 206 is located under the second area section 204, thereby becoming the lowest part of the fixture 200. The third area section 206 may be an entry part that is inserted into a bone tissue first to form a female thread inside the bone tissue. The third area section 206 may have a third thread portion 212, which has a third ridge portion 212a machined in a spiral shape on the outer circumferential surface and a third bottom portion 212b formed with a smaller radius of the central axis. The third thread portion 212 may be machined to have a slope that converges towards the end, and the third ridge portion 212a and the third bottom portion 212b may be arranged alternately along the direction of central axis (line A-A').

The cutting portion 214 may be provided at an equal interval along the outer circumferential surface from the second thread portion 210 to the third thread portion 212. The cutting portion 214 may have an up-sloping shape, winding in a spiral. As the cutting portion 214 traverses the second thread portion 210, insertion from the third area section 206 to the second area section 204 becomes easy.

The receiving portion 216 may be formed alone in the fixture 200 corresponding to the first and second area sections 202, and the hole of the second area section 204 may be machined to have a female thread for engaging with the screw 300. The receiving portion 216 may be machined to have a hole corresponding to the first area section 202, of which the diameter increases gradually towards the upper end. The hole of the first area section 202 may be formed to have an inner diameter that is larger than the diameter of the guide portion 112 and the first and second engagement structure alignment portions 108 and 114. Accordingly, the engagement area portion 104 of the fixture engagement structure 100 may enter easily into the receiving portion 216, and the fixture engagement structure 100 may rotate easily in the receiving portion 216.

The fixture 200 may include a first fixture alignment portion 218, a second fixture alignment portion 220, and a spacing portion 222 located between the fixture alignment portions 218 and 220, along the inner circumference direction of the receiving portion 216 of the first and second area sections 202 and 204, which is coupled to the fixture engagement structure 100.

In order to match the first engagement structure alignment portion 108, the first fixture alignment portion 218 may be arranged radially in the receiving portion 216. A multiplicity of the first fixture alignment portions 218 may be provided and may be arranged at an equal interval along the inner circumference direction. The first fixture alignment portion 218 may be machined to have a groove shape in a radial direction, that is, in the direction of radius tending outwards from a central axis (line A-A') of the fixture 200. In this case, the spacing portion 222 may be formed in a protruding shape. As another example, when the first engagement structure alignment portion 108 is formed as a groove in a radial direction, the first fixture alignment portion 218 may be machined to have a protruding shape. In this case the spacing portion 222 may be formed in a groove shape. In this embodiment, for the convenience of explanation, the first fixture alignment portion 218 is described to be formed in a groove shape.

In order to match the second engagement structure alignment portion 114, the second fixture alignment portion 220 may be arranged radially in the receiving portion 216. The second fixture alignment portion 220 is placed to be separate from the first fixture alignment portion 218 and may be arranged asymmetrically with respect to a center point C located on a central axis (line A-A'). The second fixture alignment portion 220 may have a larger size than the first fixture alignment portion 218 along at least one of the inner circumference direction and radial direction of the receiving portion 216. In addition, in order to correspond to the second engagement structure alignment portion 114 illustrated in FIG. 4 and FIG. 5, at least one second fixture alignment portion 220 may be formed.

When the first fixture alignment portion 218 is formed in a groove shape or in a protruding shape, the second fixture alignment portion 220 may also be machined to have the same shape as the first fixture alignment portion 218. In this embodiment, for the convenience of explanation, the second fixture alignment portion 220 is described to be formed in a groove shape.

Referring to the first and second fixture alignment portions 218 and 220 matching the first and second engagement structure alignment portions 108 and 114 illustrated in FIG. 4, the first fixture alignment portion 218 may be provided at an equal interval along an inner circumference direction. In case the second fixture alignment portion 220 does not exist, six first fixture alignment portions 218 may be provided at 60 degree intervals. When four first fixture alignment portions 218 are arranged as in FIG. 7, the first fixture alignment portions 218 may be arranged symmetrically with respect to a center point C. As illustrated in FIG. 4 and FIG. 7, for quick and exact position alignment of one second engagement structure alignment portion 114 to the second fixture alignment portion 220 and for the convenience of machining, the second engagement structure alignment portion 114 may be formed to have a larger size than the first fixture alignment portion 218 along the inner circumference direction. As an example, for the convenience of machining, convenient checking of misalignment with the fixture engagement structure 100 and exact alignment, the second fixture alignment portion 220 along the inner circumference direction may be formed to be larger than a size of inner circumference virtually connecting the neighboring first fixture alignment portions 218. As another example, for convenient rotation and quick position alignment in case of misalignment with the fixture engagement structure 100, the second fixture alignment portion 220 along the inner circumference direction may be formed to be smaller than a size of inner circumference virtually connecting the neighboring first fixture alignment portions 218. In this embodiment, the second fixture alignment portion 220 is described to have a larger size than the first fixture alignment portion 218 along the inner circumference direction. However, as another example, the second fixture alignment portion 220 may be machined to have a larger size than the first fixture alignment portion 218 along the radial direction. Hereinafter, for the convenience of explanation, an embodiment will be described regarding the second fixture alignment portion 220 having a large size in the inner circumference direction. In an embodiment of the second fixture alignment portion having a large size in the radial direction, the second fixture alignment portion may also be formed to have a larger size than the first fixture alignment portion along the inner circumference direction.

The second fixture alignment portion 220 may be machined to be symmetric with respect to an inner diameter direction (or inner radial direction) of the fixture 200. However, like the second engagement structure alignment portion 114, the shape and arrangement of the second fixture alignment portion 220 may be formed to be asymmetric with respect to a center point C. Specifically, the inner circumference of the second fixture alignment portion 220 along the inner circumference direction may be extended within a range of asymmetry with respect to the center point C. In case the inner circumference of the second fixture alignment portion 220 is extended to a range in which the inner circumference becomes symmetric with respect to the center point C, the number of the first fixture alignment portions 218 may be reduced excessively. Thus, while the fixture engagement structure 100 rotates in the fixture 200, the first engagement structure alignment portion 108 may be inserted deep into the second fixture alignment portion 220 of the fixture 200, thereby causing difficulty in additional rotation for expected position alignment.

In addition, as in FIG. 7, the second fixture alignment portion 220 may be arranged to be asymmetric with every first fixture alignment portion 218 with respect to the center point C. Accordingly, an abutment, which is fabricated by a manufacturer to have a predetermined specific position or rotational orientation, may be exactly arranged and engage with the fixture 200 in accordance with the manufacturer's intent.

In an embodiment of the second engagement structure alignment portion having a large size in the radial direction C, the second fixture alignment portion may be formed to be asymmetric with respect to the center point C in order to correspond to the second engagement structure alignment portion, and may be arranged asymmetrically with every first fixture alignment portion with respect to the center point C.

In case a multiplicity of the second engagement structure alignment portions 114a and 114b is arranged as illustrated in FIG. 5, the second fixture alignment portion is actually the same as described in FIG. 7, apart from what is described below.

In order to correspond to the second engagement structure alignment ports 114a and 114b of FIG. 5, which embody a specific position alignment between the fixture engagement structure 100 and the fixture 200, the second fixture alignment portions may be arranged to be asymmetric with respect to the center point C. The reason why the second engagement structure alignment portions 114a and 114b and the corresponding second fixture alignment portions are arranged to be asymmetric with respect to the center point C is the same as described in FIG. 5.

In addition, the second fixture alignment portions may be placed following the first fixture alignment portions that are successively arranged in order to correspond to the second engagement structure alignment portions 114a, 114b in FIG. 5. As another example, in order to correspond to the second engagement structure alignment portion of the another example described in FIG. 5, the second fixture alignment portions may be alternately arranged one by one between the first engagement structure alignment portions 108a. As yet another example, a random number of the second engagement structure alignment portions 114a and 114b may be arranged between the first engagement structure alignment portions 108a. In order to align and engage an abutment, which is fabricated to have a unique position or rotational orientation, exactly with the fixture 200, the second fixture alignment portions in the above cases may be arranged asymmetrically with every first engagement structure alignment portion 108.

In an embodiment of a second fixture alignment portion having a large size in a radial direction C, second fixture alignment portions may also be arranged in a multiple number, and the above description regarding an embodiment according to the inner circumference direction may be similarly applied.

The above-described embodiment regarding the fixture 200 shows the arrangement of the first fixture alignment portions 218 at 60 degree intervals in order to correspond to the fixture engagement structure 100 illustrated in FIG. 3, but the present disclosure is not limited thereto. For example, when the first engagement structure alignment portions 108 are constantly spaced at a different angle, the first fixture alignment portions 218 may be arranged at equal intervals of 90 degrees and may also be arranged at equal intervals of 45 degrees.

Figure 8:
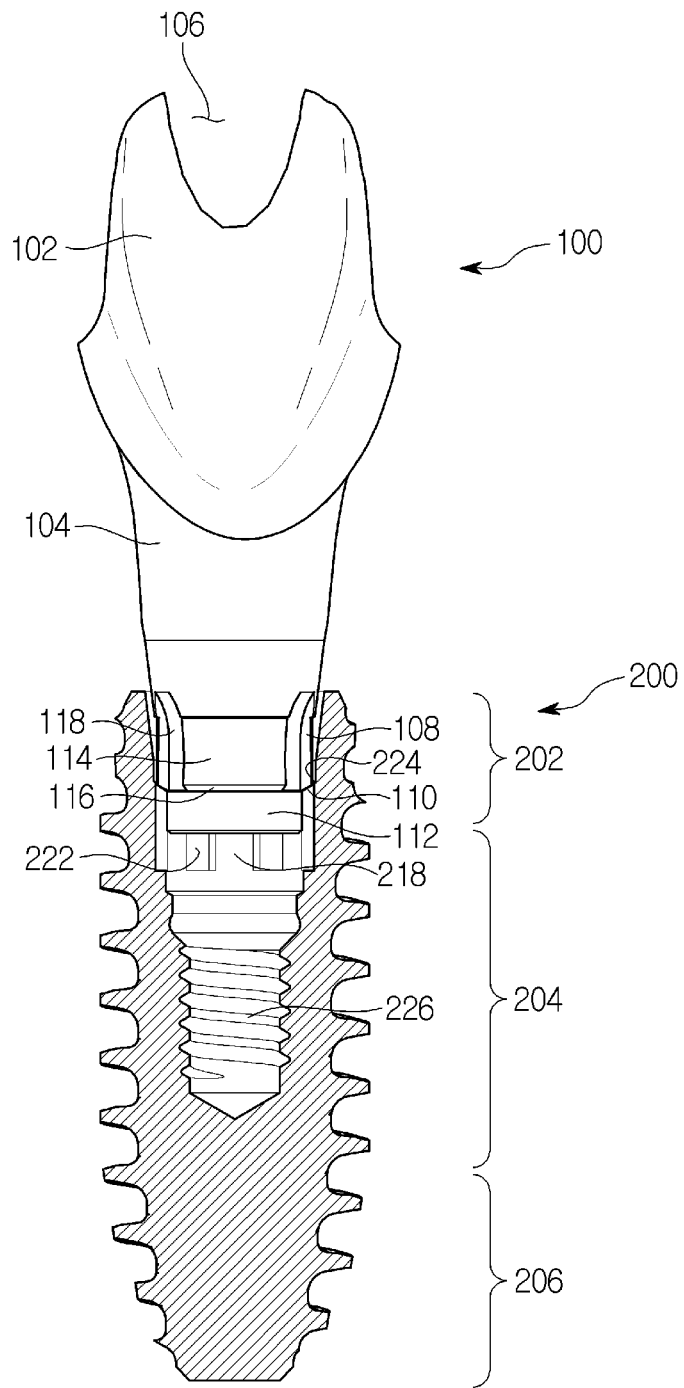
FIG. 8 is a view illustrating an example of alignment between a fixture engagement structure alignment portion and a fixture alignment portion when a fixture engagement structure and a fixture according to the present disclosures are engaged.
Figure 9A:
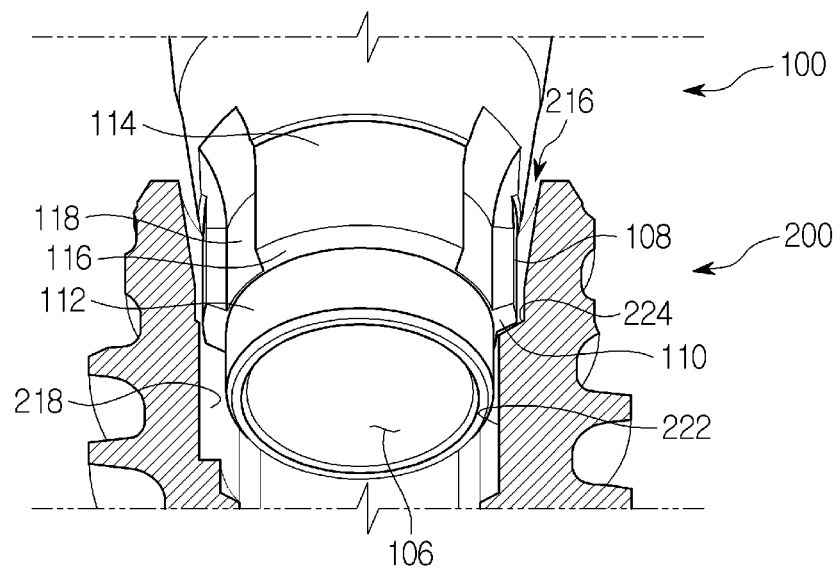
FIG. 9A and FIG. 9B are enlarged views of an engagement structure alignment portion and a fixture alignment portion that are aligned by engagement between a fixture engagement structure and a fixture according to the present disclosure.
Figure 9B:
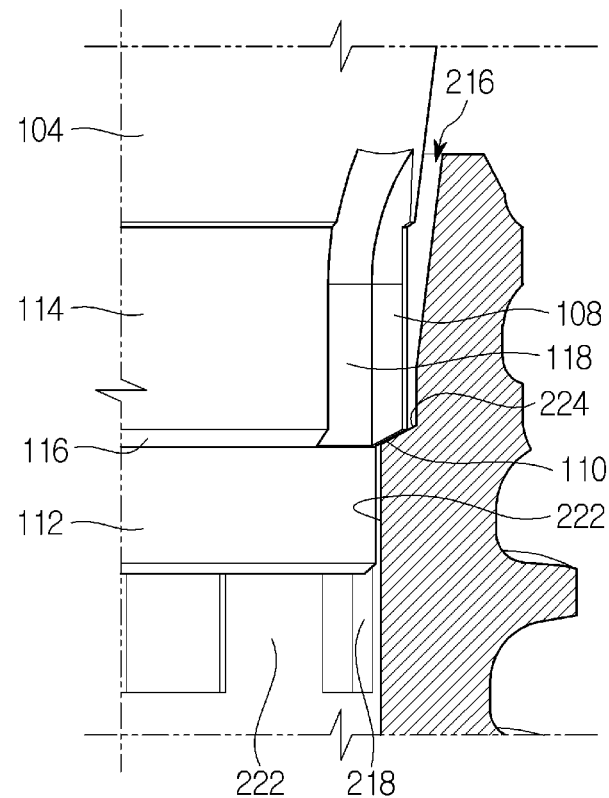

Referring to FIG. 8 to FIG. 9B, the spacing portion 222 may be formed to have an inner diameter very close to a side wall of the guide portion 112, when the fixture engagement structure 100 enters the fixture 200. As already mentioned in the description of the guide portion 112, it is possible to easily implement additional rotation of the fixture engagement structure 100 for exact position alignment on the fixture 200. FIG. 8 is a view illustrating an example of alignment between a fixture engagement structure alignment portion and a fixture alignment portion when a fixture engagement structure and a fixture according to the present disclosures are engaged. FIG. 9A and FIG. 9B are enlarged views of an engagement structure alignment portion and a fixture alignment portion that are aligned by engagement between a fixture engagement structure and a fixture according to the present disclosure.

The spacing portion 222 may have a fixture end portion 224 that is located at a side end facing the fixture engagement structure 100. The fixture end portion 224 may be formed to be tapered. A taper shape of the fixture end portion 224 may be formed in a shape corresponding to the first and second engagement structure end portions 110, and 116. As described above regarding the fixture engagement structure 100, since the first and second engagement structure end portions 110 and 116 and the fixture end portion 224 are in contact and friction, a practitioner may be able to rotate the fixture engagement structure 100 easily and stably.

In addition, as illustrated in FIG. 7 to FIG. 9B, the fixture end portion 224 may be machined to have a same level in a longitudinal direction along a central axis (line A-A') in order to smoothly rotate through touch with the first and second engagement structure end portions 110 and 116. In addition, when the fixture end portion 224 is arranged at different levels, grooves with different heights may be formed according to the first and second fixture alignment portions 218 and 220. Thus, when the fixture engagement structure 100 enters the fixture 200, the engagement structure alignment portions 108 and 114 and the fixture alignment portions 218 and 220, which do not correspond to each other, may be combined and aligned erroneously so that additional rotation for correct alignment may not be easy.

Hereinafter, the fixture engagement structure 100 will be described to be a general-type or customized abutment, and an engaging operation between the fixture engagement structure 100 and the fixture 200 will be described.

Figure 10A:
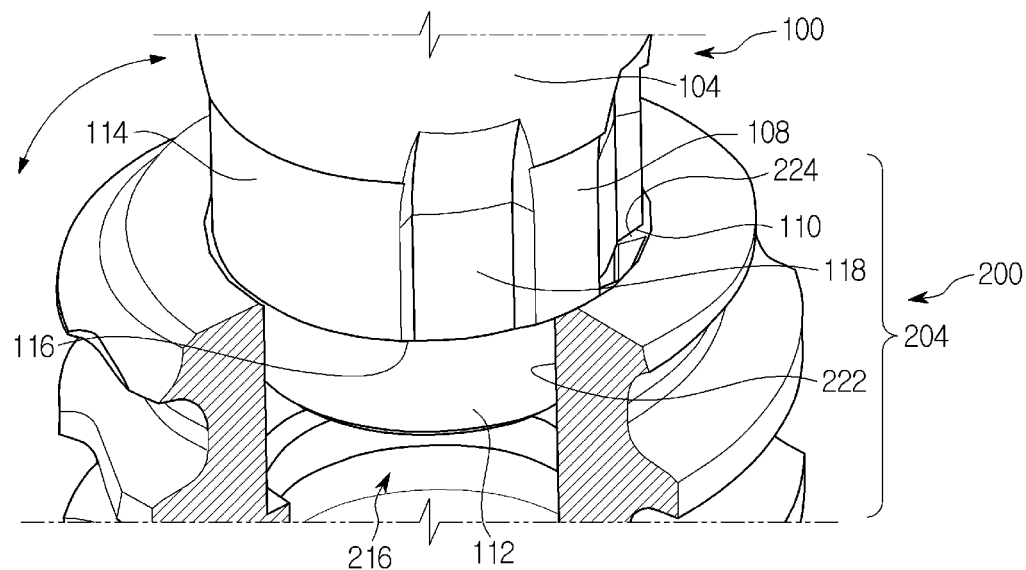
FIG. 10A and FIG. 10B are perspective views illustrating an engaging operation of a fixture engagement structure and a fixture according to the present disclosure.
Figure 10B:
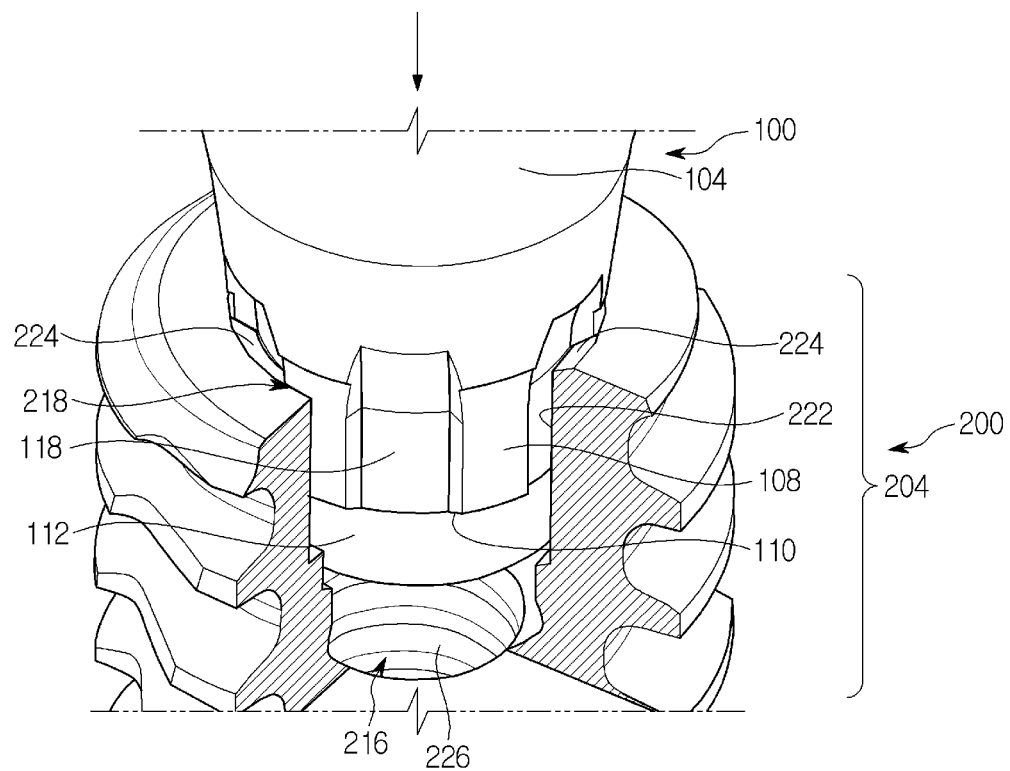

FIG. 10A and FIG. 10B are perspective views illustrating an engaging operation of a fixture engagement structure and a fixture according to the present disclosure.

The fixture engagement structure 100 may have a multiplicity of first engagement structure alignment portions 108, which are protrusively arranged at equal intervals of 60 degrees along the outer circumference direction B of the engagement area portion 104, and one second engagement structure alignment portion 114 that is protrusively placed and is spaced from the first engagement structure alignment portions 108. The second engagement structure alignment portion 114 may be placed asymmetrically with respect to the center point C. The guide portion 112 may be provided under the first and second engagement structure alignment portions 108 and 114. The first and second engagement structure alignment portions 108 and 114 may have the first and second engagement structure end portions 110 and 116 that are located at a side end facing the fixture 200. The first and second engagement structure end portions 110 and 116 may be machined to be tapered at 60 degrees and to have a same level in a longitudinal direction along the central axis (line A-A').

The fixture 200 may include a multiplicity of first fixture alignment portions 218, which are arranged in a groove shape corresponding to the first engagement structure alignment portion 108, and one second fixture alignment portion 220, which is placed in a groove shape on the inner circumference corresponding to the second engagement structure alignment portion 114, along the inner circumference direction of the receiving portion 216 of the first and second area sections 202 and 204. The spacing portion 222 may be provided between the first and second fixture alignment portions 218 and 220. The spacing portion 222 may have the fixture end portion 224 at an upper side end in order to correspond to the first and second engagement structure end portions 110 and 116.

When the fixture engagement structure 100 enters and rotates in the receiving portion 216 of the fixture 200, the guide portion 112 is capable of easily inserting the fixture engagement structure 100 into the receiving portion 216 and of rotating while adhering to the side wall of the spacing portion 222. As the guide portion 112 attaches to the spacing portion 222, even when misalignment between the first engagement structure alignment portion 108 and the second fixture alignment portion 220 causes the first engagement structure alignment portion 108 to be located in an inaccurate position like the second fixture alignment portion 220, the guide portion 112 and the spacing portion 222 attach to each other so that the first engagement structure alignment portion 108 may not be inserted deep into the second fixture alignment portion 220. Thus, it is possible to easily implement additional rotation of the fixture engagement structure 100 for exact position alignment on the fixture 200.

In addition, when the fixture engagement structure 100 rotates to align its position to the fixture 200, the first and second engagement structure end portion 110 and 116 are in contact and friction. Thus, a practitioner may be able to rotate the fixture engagement structure 100 easily and stably.

While the practitioner is rotating the fixture engagement structure 100 on the fixture end portion 224, the first and second engagement structure alignment portions 108 and 114 having different sizes may be inserted into and combined with the first and second fixture alignment portions 218 and 220, which are machined in corresponding unique shapes respectively. Accordingly, when an abutment is fabricated to have a predetermined specific position or rotational orientation, the practitioner may implement exact alignment between the fixture engagement structure 100 and the fixture 200 and quickly recognize a unique engagement position, in accordance with the manufacturer's intent.

Although the present invention has been described in detail through the representative embodiments above, it will be understood by those skilled in the art that various modifications can be made without departing from the scope of the present invention with respect to the above-described embodiments. Therefore, the scope of the present invention should not be limited to the embodiments described, but should be defined by all changes or modifications derived from the claims and the equivalent concepts thereto.

What is claimed is:

1. A fixture engagement structure, for a dental implant assembly in which the fixture engagement structure engages with a fixture inserted into a jawbone, the fixture engagement structure comprising:
    a first engagement structure alignment portion that is placed radially in an engagement area portion engaging with the fixture; and
    at least one second engagement structure alignment portion that is placed radially in the engagement area portion so as to be separate from the first engagement structure alignment portion and is arranged asymmetrically with the first engagement structure alignment portion with respect to a center point located on a central axis of the fixture engagement structure,
    wherein the second engagement structure alignment portion has a larger size than the first engagement structure alignment portion, along at least one of an outer circumference direction and a radial direction of the engagement area portion; and
    wherein the first engagement structure alignment portion comprises a first engagement structure apical end portion and the second engagement structure alignment portion comprises a second engagement structure apical end portion, such that the first and second engagement structure apical end portions are formed to have a same level with respect to a longitudinal direction along the central axis.

2. The fixture engagement structure of claim 1, wherein the first engagement structure alignment portions are placed at an equal interval along the outer circumference direction, and the second engagement structure alignment portion is placed between the first engagement structure alignment portions when there is a multiplicity of the first engagement structure alignment portions, and
    wherein the second engagement structure alignment portion according to the outer circumference direction has a larger size than an outer circumference size virtually connecting the first engagement structure alignment portions adjacent to each other.

3. The fixture engagement structure of claim 1, wherein the first engagement structure apical end portion is located at a side end facing the fixture,
    wherein the second engagement structure apical end portion is located at a side end facing the fixture.

4. The fixture engagement structure of claim 1, wherein the first engagement structure alignment portion comprises the first engagement structure apical end portion that is located at a side end facing the fixture,
    wherein the second engagement structure alignment portion comprises the second engagement structure apical end portion at a side end facing the fixture, and
    wherein the first and second engagement structure apical end portions are formed to be tapered.

5. The fixture engagement structure of claim 1, wherein the fixture has first and second fixture alignment portions corresponding to the first and second engagement structure alignment portions, and a spacing portion placed between the first and second fixture alignment portions,
    wherein the fixture engagement structure further comprises a guide portion that is provided to the engagement area portion and is placed closer to the fixture than to the first and second engagement structure alignment portions, when engaging with the fixture,
    and wherein the guide portion is formed so that the fixture engagement structure enters the fixture while the guide portion attached to a side wall of the spacing portion.

6. A fixture, in which the fixture is inserted into a jawbone of a patient and a fixture engagement structure of a dental implant assembly engages with the fixture, the fixture comprising:
    a first fixture alignment portion that is placed radially in an area portion engaging with the fixture engagement structure; and
    at least one second fixture alignment portion is placed radially in the area portion so as to be separate from the first fixture alignment portion and is arranged asymmetrically with respect to a center point located on a central axis of the fixture,
    wherein the second fixture alignment portion has a larger size than the first fixture alignment portion, along at least one of an inner circumference direction and a radial direction of the area portion,
    wherein the fixture comprises a multiplicity of fixture apical end portions such that the fixture apical end portions are formed to have a same level with respect to a longitudinal direction along the central axis, corresponding to respective structure apical end portions of the fixture engagement structure.

7. The fixture of claim 6, wherein the first fixture alignment portions are placed at an equal interval along the inner circumference direction, and the second fixture alignment portion is placed between the first fixture alignment portions when there is a multiplicity of the first fixture alignment portions, and
    wherein the second fixture alignment portion according to the inner circumference direction has a larger size than an inner circumference size virtually connecting the first fixture alignment portions adjacent to each other.

8. The fixture of claim 6, further comprising a multiplicity of spacing portions that are placed between the first and second fixture alignment portions,
wherein the spacing portions have the multiplicity of fixture apical end portions, respectively, which are located at a side end facing the fixture engagement structure.

9. The fixture of claim 6, further comprising a spacing portion that is placed between the first and second fixture alignment portions,
wherein the spacing portion has a fixture apical end portion that is located at a side end facing the fixture engagement structure, and
wherein the fixture apical end portion is formed to be tapered.

10. The fixture of claim 6, wherein the fixture engagement structure has first and second engagement structure alignment portions corresponding to the first and second fixture alignment portions, and a guide portion that is placed closer to the fixture than to the first and second engagement structure alignment portions, when engaging with the fixture,
wherein the fixture further comprises a spacing portion placed between the first and second fixture alignment portions, and
wherein the spacing portion is formed to attach to a side wall of the guide portion, when the fixture engagement structure enters the fixture.

11. The fixture of claim 6, further comprising:
a first thread portion that is placed closest to the fixture engagement structure, when the fixture engages with the fixture engagement structure;
a second thread portion that is placed under the first thread portion; and
a third thread portion that is placed under the second thread portion and is machined to have a slope converging towards an end,
wherein the second thread portion comprises a ridge portion with a spiral shape and a bottom portion having a smaller central axis radius than the ridge portion, and
wherein central axis radius of the second ridge portion and the second bottom portion are constant along the central axis, and a ratio of central axis radius between the second ridge portion and the second bottom portion ranges from 1.13:1 to 1.18:1.

12. A dental implant assembly comprising a fixture inserted into a jawbone and a fixture engagement structure engaging with the fixture, wherein the fixture engagement structure comprises:
a first engagement structure alignment portion that is placed radially in an engagement area portion engaging with the fixture; and
at least one second engagement structure alignment portion that is placed radially in the engagement area portion so as to be separate from the first engagement structure alignment portion and is arranged asymmetrically with the first engagement structure alignment portion with respect to a center point located on a central axis of the fixture engagement structure,
wherein the fixture comprises:
a first fixture alignment portion that is radially placed so as to match the first engagement structure alignment portion in an area portion engaging with the fixture engagement structure; and
at least one second fixture alignment portion that is radially placed so as to be separate from the first fixture alignment portion and is arranged asymmetrically with respect a center point located on a central axis of the fixture, in order to match the second engagement structure alignment portion in the area portion,
wherein the second engagement structure alignment portion has a larger size than the first engagement structure alignment portion along at least one of an outer circumference direction and a radial direction of the engagement area portion,
wherein the second fixture alignment portion has a larger size than the first fixture alignment portion along at least one of an inner circumference direction and a radial direction of the area portion, and
wherein the fixture comprises a multiplicity of fixture apical end portions such that the fixture apical end portions are formed to have a same level with respect to a longitudinal direction along the central axis, corresponding to respective structure apical end portions of the fixture engagement structure.

13. The fixture engagement structure of claim 1, further comprising another second engagement structure alignment portion, wherein and the other second engagement structure alignment portion is arranged symmetrically with the second engagement structure alignment portion with respect to the center point located on the central axis of the fixture engagement structure.

14. The fixture engagement structure of claim 5, wherein the guide portion is formed to implement additional rotation of the fixture engagement structure for an exact position alignment on the fixture thereby preventing the first engagement structure alignment portion from being inserted into the second fixture alignment portion.

* * * * *